Feb. 17, 1970  A. J. RAIMONDI ET AL  3,495,620
MAGNETIC VALVE
Filed Feb. 9, 1967
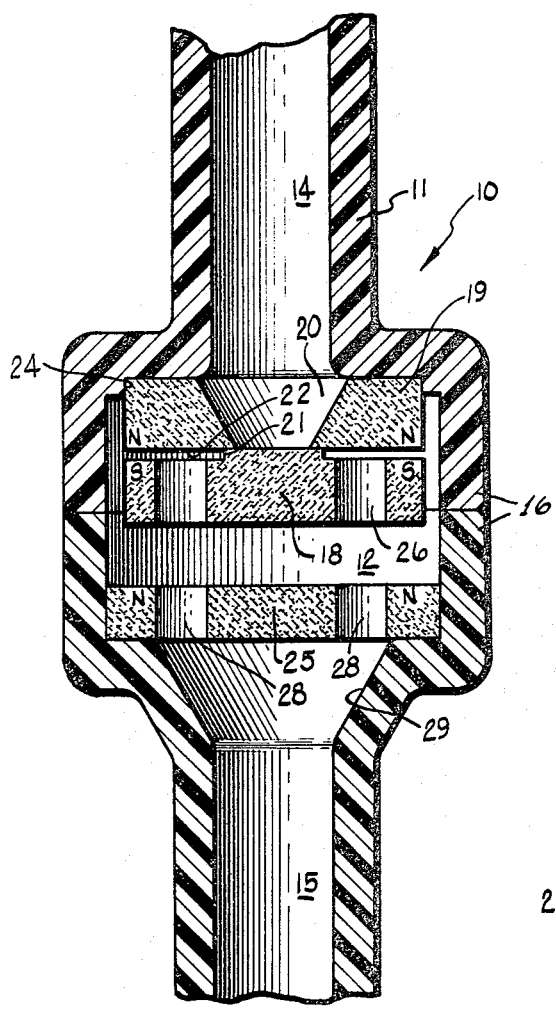
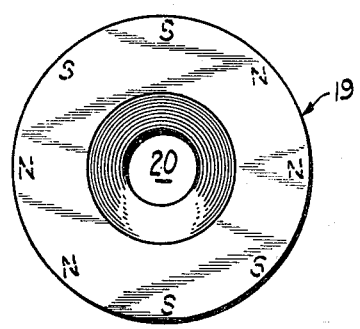
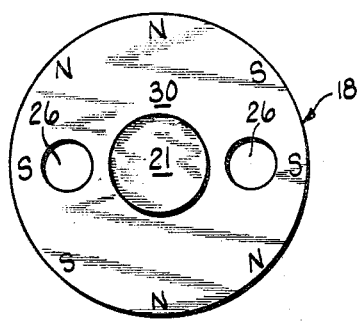
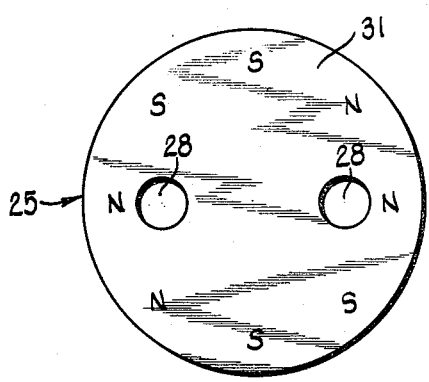
INVENTORS
ANTHONY J. RAIMONDI
SEYMOUR BAZELL
WILLIAM E. REYNOLDS
BY Anderson, Luedeka, Fitch, Even & Tabin ATTORNEYS

United States Patent Office 3,495,620
Patented Feb. 17, 1970

3,495,620
MAGNETIC VALVE
Anthony J. Raimondi and Seymour Bazell, Chicago, and William E. Reynolds, Western Springs, Ill., assignors, by mesne assignments, to Edward Weck & Company, Inc., Long Island City, N.Y., a corporation of Delaware
Filed Feb. 9, 1967, Ser. No. 614,909
Int. Cl. F16k *17/02, 31/08, 31/56*
U.S. Cl. 137—529         9 Claims

ABSTRACT OF THE DISCLOSURE

A valve having an internal chamber with a movable valve member magnetically attracted by a magnet to a position to close an inlet orifice until a predetermined fluid pressure is reached, after which the valve member moves from the inlet orifice and is attracted to and held by another magnet at a valve open position until the fluid pressure is reduced to a predetermined minimum value. The movable valve member may also be a magnet with its poles aligned with opposite poles of the other magnets to prevent rotation of the movable magnet during its longitudinal movement in the housing.

---

This invention relates to valves and more particularly to magnetic relief valves. Conventional relief or dump valves open at a given pressure and remain fully open until the pressure is relieved to a lower value at which time the valve again closes. This is in contrast to the usual diaphragm and spring ball check valves which open and close with small changes in fluid pressure. In certain applications, there is a need for a simple and low cost relief valve operable when the fluid pressure reaches an upper and lower pressure value to snap fully open or fully closed.

A general object of the invention is to provide a magnetic value of the foregoing kind which is simple and economical in construction.

A more specific object of the invention is to provide a magnetic value in which a movable valve element is a magnet which is magnetically attracted and held in its closed position to terminate fluid flow, and which is magnetically attracted and held in its open position in which fluid flow is permitted through the valve.

A further object of the invention is to employ a magnet as a valve member for moving quickly with snap action, to an attracting magnet at a valve inlet orifice and to another attracting magnet at a valve outlet orifice.

Another object of the invention is to use magnetic poles on a movable valve magnet and a valve seat magnet to align an outlet orifice in the latter with an opening in the valve member to permit the fluid flow through the valve.

A further object of the invention is to employ a magnet as a valve member for moving quickly with snap action, to an attracting magnet at a valve inlet orifice.

Another object of the invention is to use magnetic poles on a movable valve magnet and a valve seat magnet to align an outlet orifice in the latter with an opening in the valve member to permit the fluid flow through the valve.

Other objects and advantages of the invention will be apparent from the following description, taken in connection with the accompanying drawings in which:

FIGURE 1 is a sectional view taken through a valve embodying the novel features of the present invention;

FIGURE 2 is a plan view of the upper stationary magnet employed in the valve of FIGURE 1;

FIGURE 3 is a plan view of the movable valve magnet employed in the valve of FIGURE 1; and FIGURE 4 is a plan view of the lower stationary magnet employed in the valve of FIGURE 1.

As shown in the drawings for purposes of illustration, the invention is embodided in a valve 10 having a housing 11 with an enlarged interior chamber 12 intermediate an inlet tubular port 14 and outlet tubular port 15. In this exemplary embodiment, the housing is made of a non-magnetic material such as plastic, with two identical cylindrical pieces abutted and secured together at annular end walls 16 by a suitable adhesive or mechanical fastener (not shown).

The valve 10 is employed as a check and relief valve with a movable valve member 18 attracted magnetically toward an upper stationary inlet magnet 19 to close an inlet opening or orifice 20 which, in this instance, is formed in the inlet magnet 19 itself. Herein, the stationary inlet magnet 19 is in the form of a circular disc of a permanent magnet material, such as barium ferrite. The valve member 18 has a circular sealing projection 21 on an imperforate center portion facing the inlet manget 19 for seating against the inner side wall 22 of the magnet 19 to seal the inlet orifice 20 against fluid flow through the latter. The inlet manget 19 is seated and secured in the housing at an annular shoulder wall 24 coaxial with the axis of the tubular inlet port 14. The inlet orifice 20 is also coaxially aligned with the inlet port and is frusto-conical in cross-section with its wider end upstream toward the inlet port.

When the pressure of the upstream fluid reaches a predetermined pressure, the force acting on the circular area of the movable valve member at the orifice 20 causes the valve member 18 to move longitudinally in the housing chamber 12 away from the orifice 20. Because of the magnetic attraction of the stationary outlet magnet 25, the movable valve member 18 receives a snap action, i.e., a quick movement, between its closed position at the inlet orifice 20 and its fully open position. In its fully open position the valve member 18 is held by the combination of fluid pressure and the magnetic attraction of a stationary outlet magnet 25 which is longitudinally spaced from the inlet magnet 19 and located in the housing adjacent the outlet port 15. The magnetic attraction between the movable valve member 18 and the outlet magnet 25 is made less than the attraction force betwen the movable valve member and the inlet magnet 19 so that the valve closes when the fluid pressure drops below a predetermined minimum. For those fluid pressures in the range between opening and closing pressures, the valve will remain fully open rather than moving to partially restrict the fluid flow as in the case of spring or diaphragm controlled check valves. Thus, the valve of the present invention is particularly suited for use as a dump valve in which the valve fully opens to relieve the fluid pressure and is unaffected by small variations in pressure.

In this instance, the movable valve member 18 is formed with angularly spaced openings 26 extending through the disc-like body of the movable valve member 18 parallel to its axis. The openings 26 are cylindrical bore spaced radially outward of the sealing center projection 21 of the valve member. Similar cylindrical bores or openings 28 are formed in the outlet magnet 25 and are spaced angularly and radially in alignment with the openings 26 in the valve member so that fluid flows through the aligned openings 26 and 28 when the valve member is in its lower open position. The outlet magnet 25 is also formed in the shape of a disc from a permanent magnet material such as barium ferrite and is suitably fixed to the housing against longitudinal movement in the chamber 12. The outlet openings 28 are disposed in fluid communication with a frusto-conical wall 29 in the housing leading to the tubular outlet port 15.

In accordance with another important aspect of the invention, the openings 26 in the movable valve member 18 are held against angular misalignment with the openings 28 without the use of mechanical guiding surfaces or pins. To achieve the foregoing, the movable valve member 18 is also formed from a permanent magnet material, such as barium ferrite, with its magnetic poles aligned with the opposite, attracting magnetic poles of the outlet magnet 25. Herein, the valve member 18 is in the form of a disc having an upper face 30 with four angularly spaced pairs of poles, with poles of opposite polarity being indicated by the reference characters N and S. In a similar manner, each of the stationary magnets 19 and 25 is provided with four pairs of poles in their inwardly directed faces 22 and 31 with the poles spaced angularly about the discs. The north poles N on the movable magnet 18 are longitudinally aligned with the south poles S on the stationary magnets 19 and 25 so that the movable magnet 18 is attracted longitudinally without turning angularly and misaligning its openings 26 with the openings 28 in the outlet magnet 25. Any tendency of the movable magnet 18 to rotate is resisted by the repulsion of like poles and the attraction of unlike poles. By having the poles in each magnet arranged in the illustrated manner, all of the poles of movable magnet 18 are aligned with an opposite pole only when the openings 26 and 28 are aligned.

In the present instance, the magnet poles are formed on the upper side or face 30 of the movable magnet 18, and this face is always disposed closer to the upper magnet 19 than to the lower magnet 25 so that a greater coercive attraction force exists between face 30 of the movable magnet 18 and the face 22 of the upper magnet than between the face 31 of the lower magnet 25 and the lower face of the movable magnet. Thus, the magnets 19 and 25 may have about the same degree of magnetic attraction strength and be made from generally similar materials and sizes while affording a greater magnetic attraction force for closing the valve.

On the other hand, the size and strength of the inlet magnet 19 could be made greater than that of outlet magnet 25 to assure attraction of the movable magnet 18 from the outlet magnet 25 when the pressure drops to the predetermined minimum pressure.

The valve of the present invention may be used for various applications and in one application, for example, a flushing system for hydrocephalus conditions, the magnets are provided with a protective coating such as Teflon to protect them against reaction with body fluids.

From the foregoing, it will be seen that a simple, low cost magnetic valve can be obtained having a snap action to and from open and closed position at predetermined fluid pressures. Also, the valve member is a magnet which maintains its opening aligned with an outlet opening by aligned magnetic poles and without the use of mechanical guides.

While a preferred embodiment has been shown in the drawings and described herein, it is not intended to cover all modifications and alternative constructions coming within the spirit and scope of the invention as defined in the appended claims.

What is claimed is:
1. A magnetic valve comprising:
  a valve housing having a valve chamber intermediate spaced inlet and outlet ports;
  a movable valve member within said chamber;
  a first magnet disposed within said chamber adjacent said inlet port, said first magnet being positioned to exert a magnetic force upon said movable valve member to normally close said valve; and
  a second magnet disposed within said chamber adjacent said outlet port, said second magnet being positioned to exert a magnetic force upon said movable valve member of slightly lesser magnitude and in a direction opposing the force exerted upon said movable member by said first magnet;
  said magnetic forces being such that fluid pressure of a first predetermined value acting upon said movable valve member in a direction to open said valve, together with the magnetic force of said second magnet, causes said valve to snap open in a positive manner, said movable valve member being held in a position to open said valve by the combined action of said second magnet and said fluid pressure;
  said magnetic forces being such that when said fluid pressure drops to a second predetermined value substantially less than said first predetermined value, said first magnet acts to overcome the combined action of said second magnet and said reduced fluid pressure to snap said valve closed in a positive manner.

2. The valve of claim 1 in which the first magnet is in the chamber and formed with an orifice in fluid communication with the inlet port and in which the valve member has a portion to seat against the first magnet and seal against fluid flow through said orifice.

3. The valve of claim 2 in which the movable valve member has an opening through which fluid may pass and in which the second magnet in said chamber has an opening in fluid communication with said opening in the valve member when the latter is in its open valve position.

4. The valve of claim 1 in which the movable valve member is a magnet.

5. A magnetic valve comprising, the combination of a valve housing having a valve chamber intermediate spaced inlet and outlet ports; a first magnet disposed adjacent said inlet port in said chamber, said first magnet being formed with an orifice in fluid communication with said inlet port, a second magnet associated with said housing and disposed adjacent said outlet port, and a movable valve member in said chamber attracted by said first magnet to a valve closing position in which said valve member closes fluid flow from said inlet port into said chamber, said valve member having a portion to seat against said first magnet and seal against fluid flow through said orifice, said valve member being movable by fluid pressure acting thereon to a second, open position in which fluid flows through said inlet port, chamber and outlet port, the magnetic attraction force of said first magnet returning said movable valve member to its closed valve position when the fluid pressure reduces to a predetermined value, said movable valve member being a magnet and having spaced magnetic poles, said first and second magnets having spaced magnetic poles, the magnetic poles of said movable valve member being longitudinally aligned with the poles of opposite polarity of said first and second magnets to maintain alignment of said openings in said movable valve member and said second magnet.

6. The combination of claim 5 in which said first and second magnets are circular discs containing a permanent magnet material and in which said movable valve member is a circular disc containing a permanent magnet material.

7. The combination of claim 6 in which the magnetic poles of said movable valve member are in the face of the disc facing said first magnet for providing a greater magnetic attraction therewith than with said second magnet.

8. The combination of claim 7 in which said first and second magnets are approximately equal in strength and in which the magnetic pole carrying face of said movable valve member is always disposed at a distance closer to said first magnet than to said second magnet.

9. A magnetic valve comprising, the combination of, a valve housing having an enlarged chamber intermediate inlet and outlet ports, a first disc of permanent magnetic material magnetized to afford spaced poles and disposed in said chamber at said inlet port, said first disc having a central aperture in fluid communiaction with said inlet port, a second disc of permanent magnetic material magnetized to afford spaced poles and spaced in said chamber from said first disc, said second disc having openings spaced radially outward from the location of said central aperture in said first disc, and a movable disc of permanent magnetic material magnetized to afford spaced poles attracted to the first disc to close its center aperture until a predetermined fluid pressure is reached to overcome this attraction, said movable disc having openings aligned with the openings in the said second disc to allow fluid flow through the movable and second discs, the poles in said movable disc being aligned with the opposite poles in the second disc to hold said movable disc against rotation and to maintain alignment of the respective openings.

References Cited

UNITED STATES PATENTS

| | | | |
|---|---|---|---|
| 957,012 | 5/1910 | Stone | 137—516.13 XR |
| 2,646,071 | 7/1953 | Wagner | 251—65 XR |
| 2,949,931 | 8/1960 | Ruppright | 137—533.19 XR |
| 3,026,903 | 3/1962 | Roach | 251—65 XR |
| 3,265,062 | 8/1966 | Hesse | 251—65 XR |

HAROLD W. WEAKLEY, Primary Examiner

U.S. Cl. X.R.

137—533.19; 251—65

UNITED STATES PATENT OFFICE
CERTIFICATE OF CORRECTION

Patent No. 3,495,620  Dated February 17, 1970

Inventor(s) Anthony J. Raimondi et al

It is certified that error appears in the above-identified patent and that said Letters Patent are hereby corrected as shown below:

Column 1, line 57, after "orifice" insert --and to another attracting magnet at a valve outlet orifice--;

line 65, "vitw" should read --view--.

Column 2, line 2, "embodided" should read --embodied--.

Column 3, line 72, after "movable" insert --valve--.

Column 4, line 73, "communiaction" should read --communication--.

SIGNED AND SEALED
JUL 14 1970

(SEAL)
Attest:

Edward M. Fletcher, Jr.
Attesting Officer

WILLIAM E. SCHUYLER, JR.
Commissioner of Patents